Aug. 22, 1950   M. M. CAMPBELL ET AL   2,519,952
BRAKE ANCHOR PIN
Filed Oct. 20, 1949
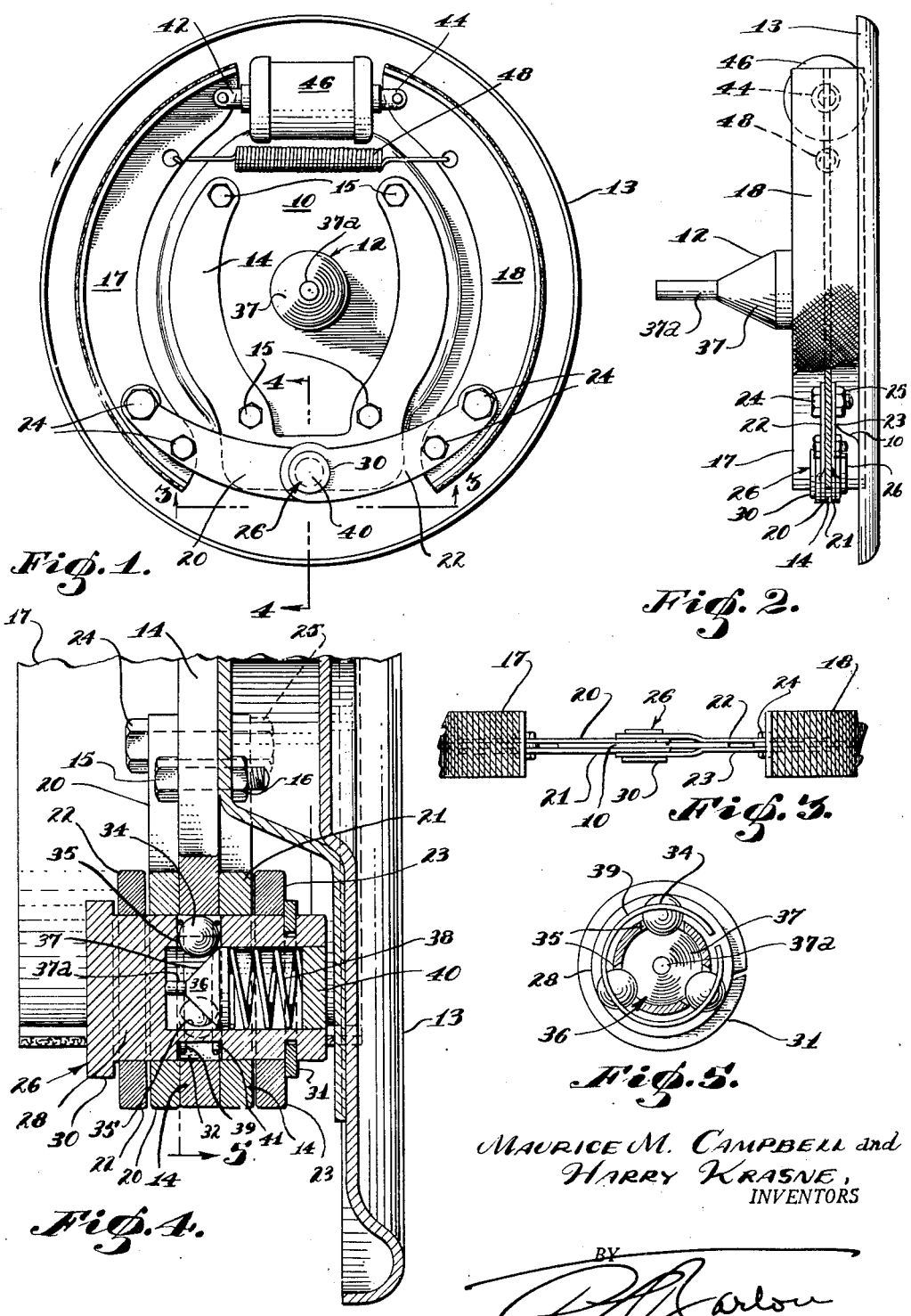
Maurice M. Campbell and
Harry Krasne,
INVENTORS
BY
ATTORNEY Patented Aug. 22, 1950

2,519,952

UNITED STATES PATENT OFFICE 2,519,952

BRAKE ANCHOR PIN

Maurice M. Campbell and Harry Krasne,
Los Angeles, Calif.

Application October 20, 1949, Serial No. 122,556

4 Claims. (Cl. 188—78)

Our invention relates to a floating anchor pin for automotive brakes.

More specifically speaking our invention relates to automotive brakes of the kind having a pair of brake shoes, one end of each of which is pivoted on a common anchor pin, while the other ends are adapted to be forced apart by the brake applying element, which may be a cam, hydraulic or compressed air cylinder and the like, to apply frictional resistance to the inside of the brake drum.

As is well known, in brakes of the kind described, the forward brake shoe during forward movement of the automobile is subjected to greater wear than the rear brake shoe since the forward shoe is moved outwardly against the brake drum at a point ahead of the anchor pin in the direction of rotation of the brake drum and tends to crowd outwardly against the brake drum while in the case of the rear brake shoe conditions are reversed and the rear brake shoe tends to straighten out or exert less frictional resistance of the brake drum.

The result of the unequal frictional wear on the front and back brake shoes is of course that the shoes require to be trued up from time to time, irrespective of the ordinary wear on the brake shoes, if maximum efficiency is to be maintained.

It is therefore an object of our invention to compensate the braking effect of the front and rear brake shoes in automotive vehicle brakes of the kind described in a simple and effective manner.

It is a further object of our invention to compensate or equalize the frictional retarding force of front and back brake shoes pivoted on a common anchor pin by providing an anchor pin construction effective to float or yieldably position the pin in a stationary part of the brake so that the pin is slightly displaced from main position if one brake shoe tends to exert greater pressure on the pin than the other brake shoe, thus equalizing the pressure of both brake shoes against the brake drum.

A further object of our invention is to provide a floating anchor pin construction for brakes which is of simple but sturdy construction and inexpensive to install either as original equipment or in substitution for the standard forms of anchor pin with which said brakes are fitted.

Still further objects and features of our invention will appear from a study of the following description read with reference to the accompanying drawing which illustrates an embodiment of our invention at present deemed preferable by us.

In the drawings

Fig. 1 is a front elevation of the left front wheel of an automobile hydraulic brake backing plate incorporating the element of our invention.

Fig. 2 is a side elevation of the parts shown in Fig. 1 with an outer member partly broken away to show interior parts.

Fig. 3 is a fragmentary view looking in the direction of the arrows 3—3 in Fig. 1.

Fig. 4 is a fragmentary cross section on the line 4—4 of Fig. 1 drawn on an enlarged scale.

Fig. 5 is a cross section on the line indicated by the pointing arrow 5 of Fig. 4 showing the brake shoe mounting element of our invention stripped from the associated parts.

In the drawings the numeral 10 indicates the usual backing plate secured to the front wheel spindle body 12 and having secured thereto a dust shield 13. The wheel of the automobile with the brake drum secured thereto is mounted on the wheel spindle with the drum enclosing the parts shown in the drawings, but since the wheel and brake drum form no part of the invention they have not been shown in the drawings and are not further referred to except that the direction of rotation of the brake drum is indicated by the arrow in Fig. 1.

The brake shoe assembly comprises a strengthening horseshoe shaped bracket 14 secured to the backing plate 10 by bolts 15 and nuts 16. A front brake shoe 17 and back brake shoe 18 are rigidly secured at their lower ends to links 20, 21 and 22, 23 respectively by bolts 24 and nuts 25. It will be seen that links 20 and 22 are positioned on one side of bracket 14 and links 21 and 23 on the opposite side of the bracket 14, Fig. 4.

The links are pivoted at their lower ends on an anchor pin generally indicated at 26, the construction of which provides the constructional embodiment of our invention.

The anchor pin 26 comprises a tubular outer shell 28 of considerable thickness having a head 30 at its outer end which head lies against the outer articulated link 22, the shell being positioned against the surface of the inner link 23 by a split ring 31 inserted in a groove cut in the periphery of the inner end of the shell.

A peripheral groove 32 is cut in the shell 28 in line with the bracket 14 in which the pin is mounted and slightly wider than the thickness of the bracket, the bearing surface of the pin in the bracket being provided by contact therewith of a plurality of steel balls 34 projecting through holes 35 drilled through the bottom of the groove 32, and backed up by a thrust member 36 mounted for sliding movement in the bore of the pin and provided with a conical face 37 engaging under the balls 34.

The thrust member is urged toward a position to hold the balls 34 against the wall of the hole in bracket 14, in which the pin is mounted, by a strong compression spring 38 arranged between the back of thrust member 36 and a plug 40 filling the outer end of the bore of pin 26 and secured therein in any suitable way. The forward movement of the thrust member may be limited by a forward extension 37a of the thrust member. Split rings 39, 41 may be provided to hold the balls against falling out of the holes 35 when the pin is not positioned in the bracket 14.

The brake shoes are connected at their upper ends to the opposed pistons 42, 44 of a hydraulic wheel cylinder 46 in the usual manner. Cylinder 46, it will be understood, is connected to a master hydraulic cylinder (not shown) by which pressure is supplied to cylinder 46 between the pistons 42, 44 when it is desired to apply the brakes.

When the brakes are applied, while the vehicle is in forward motion, brake shoe 17 will be under a greater frictional force exerted by the brake drum rotating in the direction of the arrow in Fig. 1, than the brake shoe 18, for the reasons before given. The greater force transmitted to the floating anchor pin 26 by brake shoe 17 will force the floating anchor pin slightly in the direction of rotation of the brake drum increasing the pressure of brake shoe 18 against the brake drum until the frictional resistance of shoes 17 and 18 are equalized. Conventional spring 48 restores the brake shoes to normal position once the brake cylinder pressure is removed.

The floating anchor pin construction of our invention is therefore effective to equalize wear on brakes of the kind referred to, and works well in actual practice.

While we have particularly described and illustrated a preferred embodiment of our invention, it is to be understood that the scope of our invention is not limited by the described embodiment, since various changes and modifications may be made by those skilled in the art without departing from the scope of the invention as intended to be defined by the appended claims.

What we claim is:

1. In a brake having front and back brake shoes pivoted on a common anchor pin mounted in a stationary part of the brake assembly, an anchor pin assembly comprising: a tubular shell mounted to extend through a hole formed in the stationary part, and having holes formed therein in the plane of said stationary part; ball bearings mounted one in each of said holes and affording the bearing surface for the pin in said stationary part; and resilient means effective to urge said means outwardly and normally center the anchor pin in the stationary part.

2. In a brake having front and back brake shoes pivoted on a common anchor pin mounted in a stationary part of the brake assembly, an anchor pin assembly comprising: a tubular shell mounted to extend through a hole formed in the stationary part and having holes formed therein in the plane of said stationary part; ball bearings mounted one in each of said holes and affording the bearing surface for the pin in said stationary part; a pressure member arranged for sliding movement in said shell and having a conical face engaging under said ball bearings; and resilient means urging said pressure member against said ball bearings and effective to normally center the pin in the stationary member, but permitting greater pressure exerted on the pin by one brake shoe than the other to displace the pin in the stationary member so as to transmit pressure to the brake shoe tending to exert less pressure on the pin.

3. An anchor pin construction as set forth in claim 2 and in which said resilient means comprise a compression spring; and a plug closing the end of said tubular shell at the end spaced from the end of said pressure member, and maintaining said spring under compression against said pressure member.

4. An anchor pin construction as set forth in claim 2 and in addition comprising retaining rings effective to prevent the balls from leaving the holes in the tubular shell in which they are mounted.

MAURICE M. CAMPBELL.
HARRY KRASNE.

REFERENCES CITED

The following references are of record in the file of this patent:

UNITED STATES PATENTS

| Number | Name | Date |
| --- | --- | --- |
| 2,102,851 | La Brie | Dec. 21, 1937 |
| 2,157,994 | Baisch | May 9, 1939 |
| 2,319,231 | Hawley | May 18, 1943 |
| 2,355,425 | Daniels | Aug. 8, 1944 |